(12) United States Patent
Kitagawa

(10) Patent No.: US 10,008,733 B2
(45) Date of Patent: Jun. 26, 2018

(54) BATTERY MANUFACTURING APPARATUS

(71) Applicant: Nissan Motor Co., Ltd., Yokohama-shi, Kanagawa (JP)

(72) Inventor: Shinichiro Kitagawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 26 days.

(21) Appl. No.: 15/326,677

(22) PCT Filed: May 29, 2015

(86) PCT No.: PCT/JP2015/065622
§ 371 (c)(1),
(2) Date: Jan. 17, 2017

(87) PCT Pub. No.: WO2016/021288
PCT Pub. Date: Feb. 11, 2016

(65) Prior Publication Data
US 2017/0214078 A1    Jul. 27, 2017

(30) Foreign Application Priority Data

Aug. 8, 2014 (JP) ................................ 2014-162887

(51) Int. Cl.
*H01M 10/04* (2006.01)
*H01M 2/10* (2006.01)

(52) U.S. Cl.
CPC ..... *H01M 10/0404* (2013.01); *H01M 2/1077* (2013.01)

(58) Field of Classification Search
CPC .................................................. H01M 10/0404
See application file for complete search history.

(56) References Cited

FOREIGN PATENT DOCUMENTS

JP       2006302715 A  * 11/2006
JP       2009-231267 A    10/2009

* cited by examiner

*Primary Examiner* — Maria Laios
(74) *Attorney, Agent, or Firm* — Global IP Counselors, LLP

(57) ABSTRACT

A battery manufacturing apparatus is configured to produce a plurality of types of battery modules (first battery module and second battery module) having a cell unit (flat battery) housed inside a case having an upper case and a lower case and having different specifications between a plurality of components (bolted brackets and sleeves) attached to the case. The battery manufacturing apparatus has a first attachment mechanism, a second attachment mechanism and a battery housing mechanism. The first attachment mechanism attaches to one of the upper case and the lower case of the plurality of components having different specifications. The second attachment mechanism attaches to one of the upper case and the lower case of the plurality of components having no specification differences. The battery housing mechanism has a flat battery arranged between the upper case and the lower case.

4 Claims, 7 Drawing Sheets

BATTERY MANUFACTURING APPARATUS

CROSS-REFERENCE TO RELATED APPLICATIONS

This application is a U.S. National stage application of International Application No. PCT/JP2015/065622, filed on May 29, 2015, which claims priority to Japanese Patent Application No. 2014-162887 filed on Aug. 8, 2014, and which is hereby incorporated herein by reference.

BACKGROUND

Field of the Invention

The present invention relates to manufacturing battery modules.

Background Information

A battery pack comprises a plurality of battery modules. A battery module is configured to house a cell unit in a case having an upper case and a lower case, where the cell unit comprises a plurality of stacked flat batteries (for example refer to Patent Document 1: Japanese Laid-Open Patent Application No. 2009-231267).

SUMMARY

The structures of a battery module are not all the same. For example, the specifications of components such as sleeves and brackets that are attached to the case are different; therefore, it is necessary separately to form a plurality of types of battery modules. Therefore, equipment that detects specification differences is disposed in a production line of battery modules in order to prevent the production of battery modules with erroneous specifications (battery module to which erroneous components are attached), but there is the problem of increased equipment costs.

The present invention was made to solve the problem accompanying the prior art described above, and the object thereof is to provide a battery manufacturing apparatus for manufacturing battery modules, capable of reducing equipment costs.

In order to achieve the object described above, the present invention concerns a battery manufacturing apparatus that produces a plurality of types of battery modules having a flat battery housed inside a case having an upper case and a lower case, and having different specifications between a plurality of components that are attached to the case. The battery manufacturing apparatus has a first attachment mechanism wherein the plurality of components having different specifications are attached to either the upper case or the lower case; a second attachment mechanism wherein components having no specification differences are attached to the other out of the upper case and the lower case; and a battery housing mechanism having the flat battery arranged between the upper case and the lower case.

According to the present invention, the plurality of components having different specifications are collectively attached to one of the upper case and the lower case, and thus it is not necessary to dispose equipment to detect specification differences with respect to the other of the upper case and the lower case. Accordingly, capital investment costs are reduced. Therefore, it is possible to provide a battery manufacturing apparatus for manufacturing battery modules, capable of reducing equipment costs.

Other objects, features, and characteristics of the present invention shall become apparent with reference to the preferred embodiments illustrated in the following descriptions and appended drawings.

DETAILED DESCRIPTION OF THE EMBODIMENTS

Figure 1:
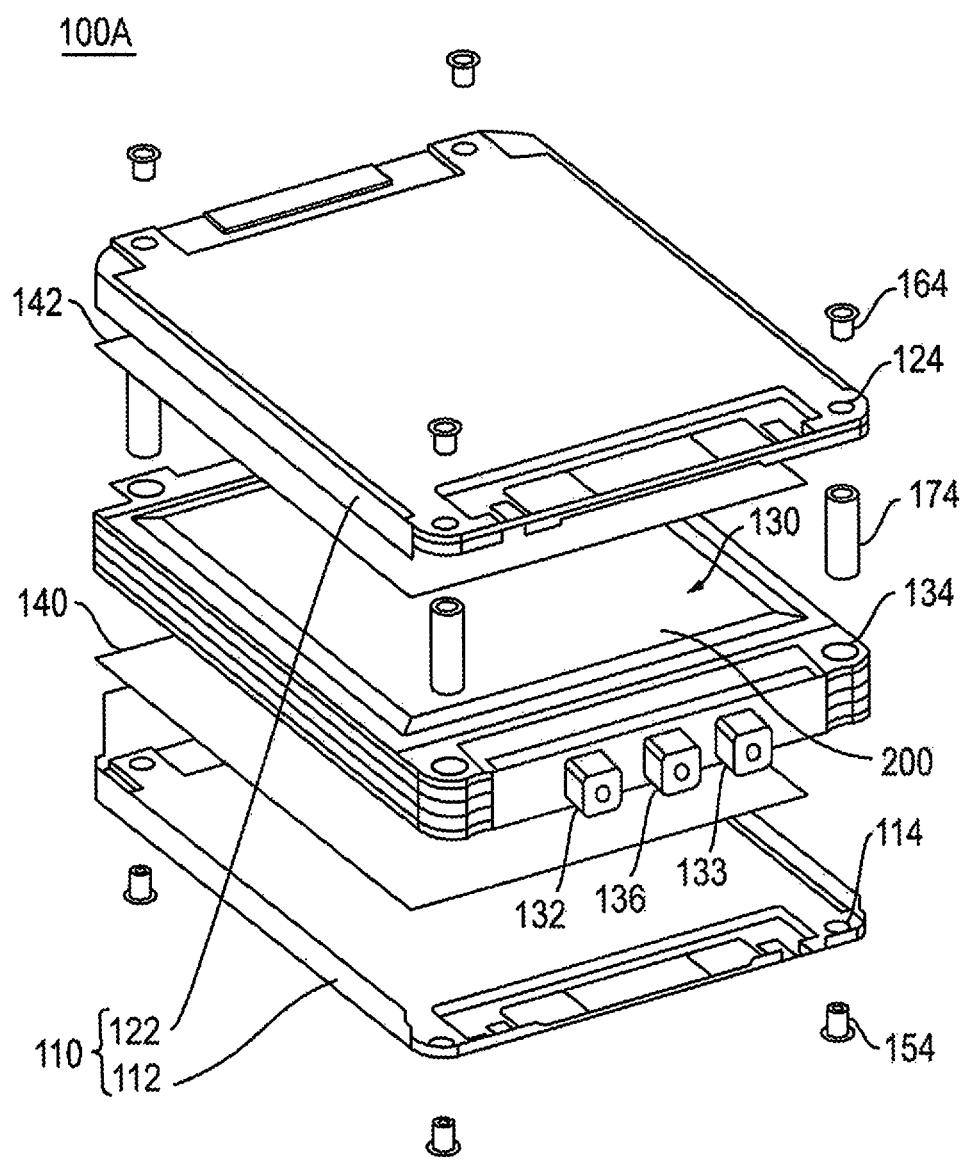
FIG. 1 is an exploded perspective view for explaining a first battery module according to an embodiment of the present invention.

An embodiment of the present invention will be described below with reference to the drawings. The dimensional ratios in the drawings are exaggerated for convenience of explanation and may differ from the actual ratios.

Figure 2:
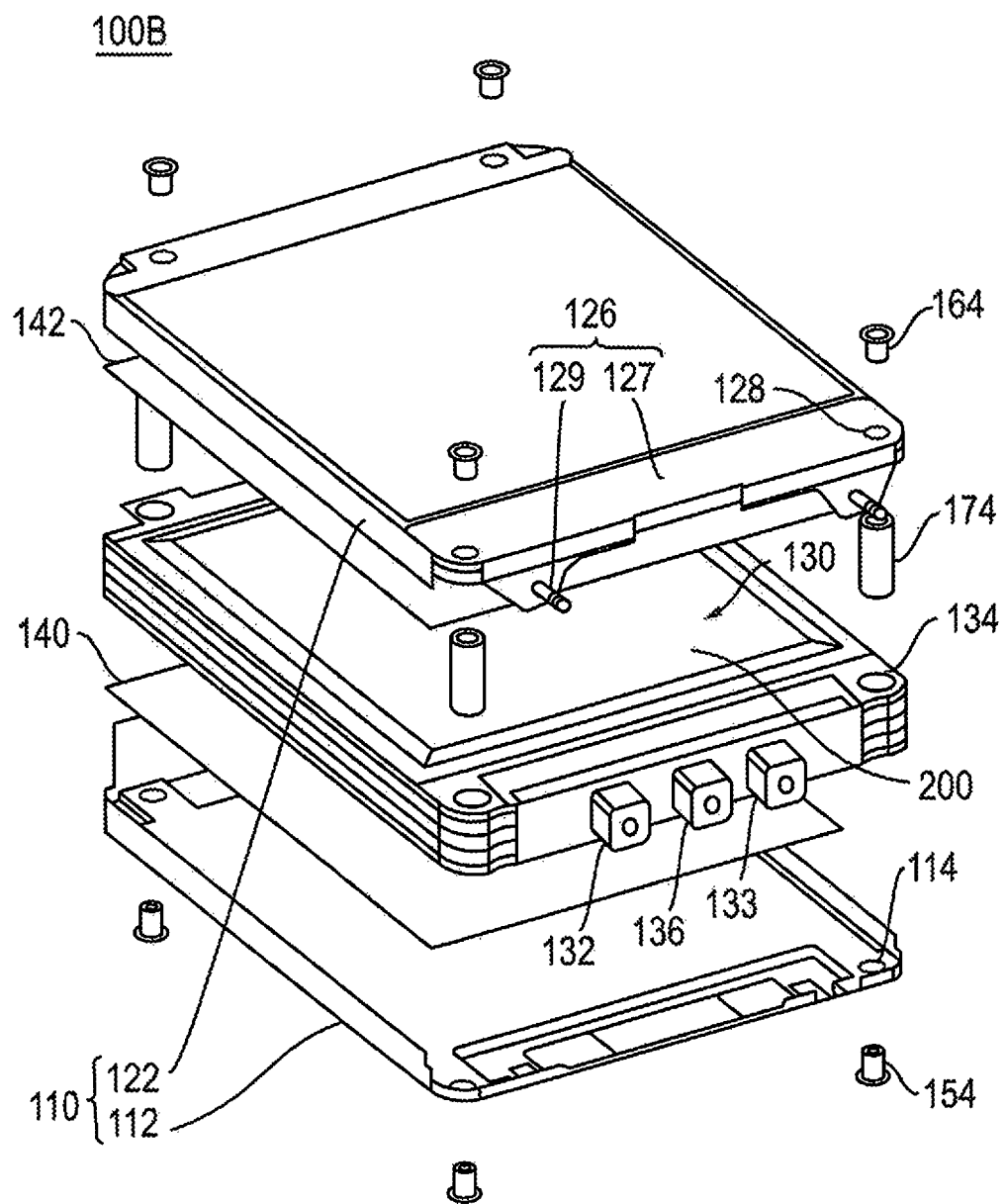
FIG. 2 is an exploded perspective view for explaining a second battery module according to an embodiment of the present invention.
Figure 3:
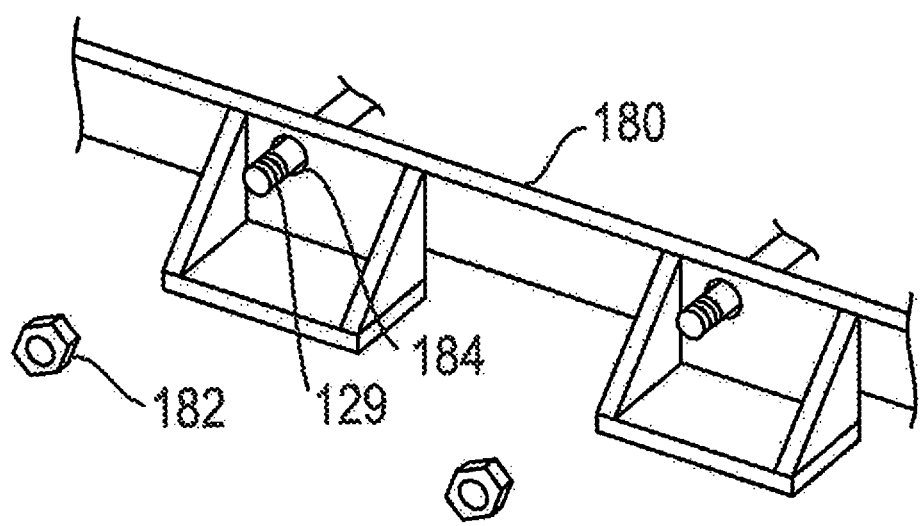
FIG. 3 is a perspective view for explaining the use of the bolted brackets illustrated in FIG. 2.

FIGS. 1 and 2 are exploded perspective views for explaining the first battery module and the second battery module according to an embodiment of the present invention, and FIG. 3 is a perspective view for explaining the use of the bolted brackets illustrated in FIG. 2.

The battery module according to an embodiment of the present invention is configured from a plurality of types of battery modules having different specifications between a plurality of components (a first battery module 100A illustrated in FIG. 1 and a second battery module 100B illustrated in FIG. 2).

The first battery module 100A is a unit when assembling a battery pack together with the second battery module 100B, and comprises a module case 110, a cell unit 130, a pair of insulating sheets 140, 142, a plurality of eyelets 154, 164 and a plurality of sleeves 174.

The module case 110 is used for housing the cell unit 130, and is configured from a lower case 112 and an upper case 122.

A cell unit 130 is placed on the lower case 112, and a through-hole 114 is formed at each of the four corner locations thereof. The through-holes 114 are used for inserting the eyelets 154. The upper case 122 is a lid that is disposed so as to cover the cell unit 130 that is placed on the lower case 112, configured to form a box shape integrally with the lower case 112, and a through-hole 124 is formed at each of the four corner locations thereof. The through-holes 124 are used for inserting the eyelets 164, and are aligned with the through-holes 114 of the lower case 112.

The lower case 112 and the upper case 122 are configured from, for example, a relatively thin-walled steel plate or aluminum plate, and a predetermined shape is imparted thereto by press working.

The cell unit 130 has disposed therein: a flat battery 200, and a plurality of through-holes 134, a pair of external output terminals 132 and 133 and a voltage detection terminal 136.

The flat battery 200 is, for example, a lithium ion secondary battery (unit cell). The through-holes 134 are formed at each of the four corner locations of the cell unit 130, and are used for inserting the sleeves 174. In addition, the through-holes 134 are aligned with the through-holes 114 of the lower case 112 and the through-holes 124 of the upper case 122. The external output terminals 132 and 133 are a positive terminal and a negative terminal that are guided from the module case 110 to the outside. The voltage detection terminal 136 is a terminal that is used to detect the voltage of the flat battery 200.

In the present embodiment, the cell unit 130 comprises a laminated body comprising four flat batteries 200, which are connected in two parallel, two series. The cell unit 130 is not limited to a mode comprising four flat batteries 200. The connection mode of the flat batteries 200 is not limited to two parallel, two series.

The insulating sheets 140, 142 are configured from, for example, polypropylene (PP). The insulating sheet 140 is disposed between the lower case 112 and the cell unit 130. The insulating sheet 142 is disposed between the upper case 122 and the cell unit 130.

The eyelets 154, 164 and the sleeves 174 are a fastening means of the lower case 112 and the upper case 122. That is, the distal end of the eyelet 154 that is inserted into the through-hole 114 of the lower case 112 is crimped (press-fitted) and fixed to one end of the sleeve 174 that is inserted into the through-hole 134 of the cell unit 130, while the distal end of the eyelet 164 that is inserted into the through-hole 124 of the upper case 122 is crimped (press-fitted) and fixed to the other end of the sleeve 174 that is inserted into the through-hole 134 of the cell unit 130.

The fastening of the lower case 112 and the upper case 122 is not limited to the configuration described above; for example, it is also possible to appropriately apply winding of the ends, welding, or screwing with a nut and a bolt, if necessary.

Next, the second battery module 100B will be described.

The second battery module 100B is generally different from the first battery module 100A in comprising bolted brackets 126 and in the length of the sleeves 174 (refer to FIG. 2). That is, regarding the first battery module 100A and the second battery module 100B, the plurality of components having different specifications are the bolted brackets 126 and the sleeves 174.

Each of the bolted brackets 126 comprises a main body portion 127 that is fixed to the upper case 122, and a pair of bolts 129 that protrude from the main body portion 127.

The main body portion 127 comprises through-holes 128 that are formed in two locations. The through-holes 128 are aligned with the through-holes 124 in two locations of the upper case 122 (refer to FIG. 1), and are configured such that the eyelets 164 can be inserted into the through-holes 124 via the through-holes 128. The through-holes 124 in two locations of the upper case 122 are positioned in the vicinity of the side on which the external output terminals 132 and 133 and the voltage detection terminal 136 of the cell unit 130 are arranged.

The bolts 129 is used for fixing the second battery module 100B to a fastening member 180, as illustrated in FIG. 3. The fastening member 180 is, for example, a member for coupling a pair of end plates of a battery pack, and comprises a pair of through-holes 184 in which the bolts 129 are inserted. The bolts 129 are inserted into the through-holes 184 and a nut 182 threaded thereon. Accordingly, the second battery module 100B is fixed (held) to the fastening member 180.

Therefore, for example, when configuring a battery pack by stacking the first battery module 100A and the second battery module 100B, it is possible to use the bolts 129 of the bolted brackets 126 to fix (hold) the second battery module 100B to a fastening member that couples a pair of end plates of the battery pack. Accordingly, it is easy to appropriately configure a battery pack by alternately stacking a first battery module 100A and a second battery module 100B, or by disposing and stacking one second battery module 100B for every several first battery modules 100A.

The lengths of the sleeves 174 of the second battery module 100B are adjusted to be shorter than the lengths of the sleeves 174 of the first battery module 100A in order to absorb the difference caused by the presence/absence of the bolted brackets 126 (to make the thickness of the first battery module 100A the same as the thickness of the second battery module 100B). For example, the lengths of the sleeves 174 of the second battery module 100B are set to be shorter by an amount that corresponds to the thickness of the bolted brackets 126.

The fastening member 180 is not limited to a member that couples a pair of end plates of a battery pack. There are cases below in which the sleeves 174 of the first battery module 100A and the sleeves 174 of the second battery module 100B are referred to as the long sleeve and the short sleeve.

Next, the flat battery 200 included in the cell unit 130 will be described in detail.

Figure 4:
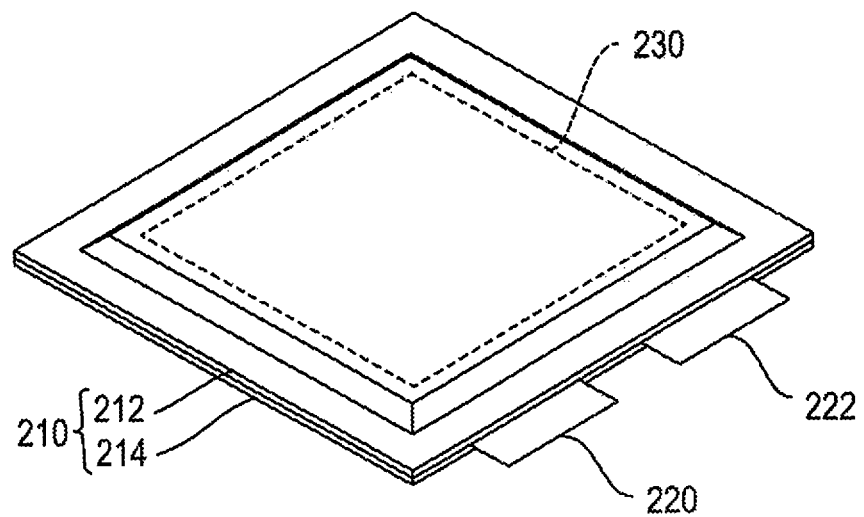
FIG. 4 is a perspective view for explaining the flat battery included in the cell unit illustrated in FIG. 1 and FIG. 2.
Figure 5:
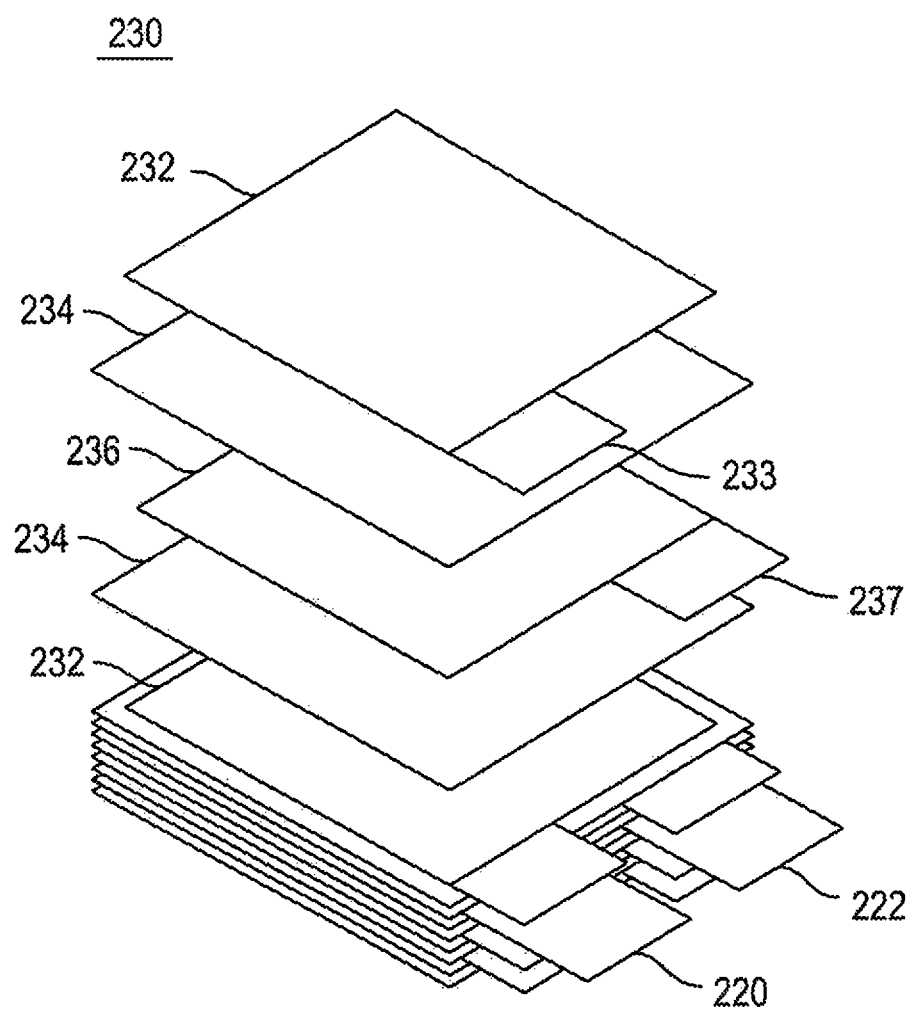
FIG. 5 is an exploded perspective view for explaining the power generating element included in the flat battery.

FIG. 4 is a perspective view for explaining the flat battery included in the cell unit illustrated in FIGS. 1 and 2, and FIG. 5 is an exploded perspective view for explaining the power generating element included in the flat battery.

The flat battery 200 comprises an outer body 210, a power generating element 230, and current collector tabs 220 and 222, as illustrated in FIG. 4.

The outer body 210 is made of a pair of substantially rectangular polymer-metal composite laminate films 212 and 214, and seals the power generating element 230 by coating so as to sandwich the power generating element 230 in order to seal the perimeter thereof. The polymer-metal composite laminate films 212 and 214 each comprises a resin layer that is positioned inside, a resin layer that is positioned outside, and a metal layer that is disposed between the resin layers. A seal is formed by bonding the resin layers of the polymer-metal composite laminate films 212 and 214 by thermal fusion.

The polymer-metal composite laminate films 212 and 214 facilitate achieving a reduction in weight of the outer body 210 and ensuring thermal conductivity and strength, and is also preferable in the sense of being able easily and reliably to execute the sealing of the outer perimeter edge of the outer body 210.

Thermoplastic resin material such as polypropylene (PP) and polyethylene (PE) are applicable as materials that constitute the resin layer. Examples of materials that constitute the metal layer include metals (including alloys) such as aluminum, stainless steel, nickel, and copper. The outer body 210 is not limited to a mode configured by a pair of the laminate films 212 and 214; for example, it is also possible to apply laminate film that is formed into a bag-like shape in advance.

Next, the power generating element 230 will be described.

The power generating element 230 is a part in which a charge/discharge reaction actually proceeds, and is formed by laminating a negative electrode 232, a separator 234, and a positive electrode 236, as illustrated in FIG. 5. The number of laminations is appropriately set giving consideration to the required capacity, and the like.

The negative electrode 232 is made by active material layers being formed on both surfaces of a thin sheet-like negative electrode current collector. The negative electrode current collector is made of a highly conductive member (collector foil), and comprises a tab portion 233 that comes into electrical contact with the current collector tab 220. The tab portion 233 is disposed in order to output the generated electricity to the outside, and protrudes from one side of the negative electrode 232. The active material layer (negative electrode active material layer) is a region (region containing) in which negative electrode active material is disposed, in which lithium can be inserted and from which lithium can be removed, and is disposed on both surfaces of the negative electrode current collector excluding the tab portion 233, as well as being in electrical contact with the negative electrode current collector.

The positive electrode 236 is made by active material layers being formed on both surfaces of a thin sheet-like positive electrode current collector. The positive electrode current collector is made of a highly conductive member (collector foil), and comprises a tab portion 237 that comes into electrical contact with the current collector tab 222. The tab portion 237 is disposed in order to output the generated electricity to the outside and protrudes from one side of the positive electrode 236. The active material layer (positive electrode active material layer) is a region (region containing) in which positive electrode active material is disposed, in which lithium can be inserted and from which lithium can be removed, and is disposed on both surfaces of the positive electrode current collector excluding the tab portion 237, as well as being in electrical contact with the positive electrode current collector. The disposed size of the positive electrode active material layer is set to be slightly smaller than the disposed size of the negative electrode active material layer of the negative electrode 232.

It is preferable to apply carbon material and alloy-based negative electrode material as the negative electrode active material relating to the active material layer of the negative electrode 232, from the point of view of capacity and output characteristics. Examples of carbon materials include graphite, carbon black, activated carbon, carbon fiber, coke, soft carbon, and hard carbon. The alloy-based negative electrode material is, for example, silicon, silicon oxide, tin dioxide, silicon carbide, and tin, and preferably contains an element that can be alloyed with lithium.

It is preferable to apply lithium-transition metal composite oxide as the positive electrode active material relating to the active material layer of the positive electrode 236 from the standpoint of capacity and output characteristics. Examples of the lithium-transition metal composite oxide include Li/Co-based composite oxides such as $LiCoO_2$, Li/Ni-based composite oxides such as $LiNiO_2$, Li/Mn-based composite oxides such as spinel $LiMn_2O_4$, and $LiFeO_2$.

The active material layer further comprises an additive agent, such as a binder and a conductive assistant. Examples of the binder include polyamic acid, polyethylene (PE), polypropylene (PP), polyethylene terephthalate (PET), polyether nitrile (PEN), polyimide (PI), polyamide (PA), polytetrafluoroethylene (PTFE), styrene butadiene rubber (SBR), polyacrylonitrile (PAN), polymethyl acrylate (PMA), polymethyl methacrylate (PMMA), polyvinyl chloride (PVC), polyvinylidene fluoride (PVdF), or mixtures thereof. The conductive assistant is an additive to be blended in order to improve the conductivity of the active material layer, examples of which include carbon black such as acetylene black, graphite, and carbon materials such as vapor-grown carbon fiber.

Examples of the materials for the negative electrode current collector and the positive electrode current collector include iron, stainless steel, chromium, nickel, manganese, titanium, molybdenum, vanadium, niobium, aluminum, copper, silver, gold, platinum, and carbon. Aluminum and copper are preferable from the standpoint of electron conductivity and battery operating potential.

The separator 234 configures an electrolyte layer comprising a microporous sheet (film) containing an electrolytic solution. The size of the separator 234 is set to be larger than the disposed size of the active material layer of the positive electrode 236.

It is possible to use polyolefins such as polyethylene (PE) and polypropylene (PP), a laminated body having a three-layer structure of polypropylene (PP)/polyethylene (PE)/polypropylene (PP), polyamide (PA), polyimide (PI), and nonwoven textile, as the material for the separator. Examples of nonwoven textile include cotton, rayon, acetate, nylon, and polyester.

The separator 234 exhibits ion permeability and electrical conductivity by being impregnated with electrolytes. Examples of electrolytic solution contained in the separator 234 include liquid electrolytes and polymer electrolytes.

A liquid electrolyte has a form in which lithium salt, which is a supporting salt, is dissolved in an organic solvent, which is a plasticizer. Examples of organic solvents that are used as a plasticizer include cyclic carbonates and linear carbonates. Examples of cyclic carbonates include propylene carbonate, ethylene carbonate (EC), and vinylene carbonate. Examples of linear carbonates include dimethyl carbonate, methyl ethyl carbonate, and diethyl carbonate (DEC). Examples of supporting salts include inorganic acid anionic salts, such as $LiPF_6$, $LiBF_4$, $LiClO_4$, $LiAsF_6$, $LiTaF_6$, $LiAlCl_4$, and $Li_2B_{10}Cl_{10}$, and organic salt anionic salts such as $LiCF_3SO_3$, $Li(CF_3SO_2)_2N$, and $Li(C_2F_5SO_2)_2N$.

The polymer electrolyte is classified into gel electrolytes that comprises an electrolytic solution, and true polymer electrolytes that do not comprise an electrolytic solution. The gel electrolyte has a structure in which liquid electrolytes are injected in a matrix polymer made of ion-conducting polymers. Examples of the ion-conducting polymer include polyethylene oxide (PEO), polypropylene oxide (PPO), and copolymers thereof. The true polymer electrolyte has a structure in which supporting salt (lithium salt) is dissolved in the matrix polymer described above, and does not comprise an organic solvent that is a plasticizer.

Next, the current collector tabs 220 and 222 will be described.

The current collector tabs 220 and 222 are connected to the tab portions 233 and 237 of the negative electrode 232 and the positive electrode 236, and are led outside from the outer peripheral edge of the outer body 210. The contact portion between the current collector tabs 220 and 222 and the resin layer of the outer body 210 (polymer-metal composite laminate films 212 and 214) is bonded to ensure the hermeticity of the outer body 210. The current collector tab 220 is for the negative electrode, and the current collector tab 222 is for the positive electrode.

The current collector tabs 220 and 222 are electrically connected accordingly to the external output terminals, and the voltage detection terminal 136. The current collector tabs 220 and 222 and the bus bar are bonded by, for example, ultrasonic welding.

Examples of the materials that configure the current collector tabs 220 and 222 include iron, stainless steel, chromium, nickel, manganese, titanium, molybdenum, vanadium, niobium, aluminum, copper, silver, gold, platinum, and carbon. Aluminum and copper are preferable from the standpoint of electron conductivity and the battery operating potential.

The battery manufacturing apparatus that produces the first battery module 100A and the second battery module 100B will now be described.

Figure 6:
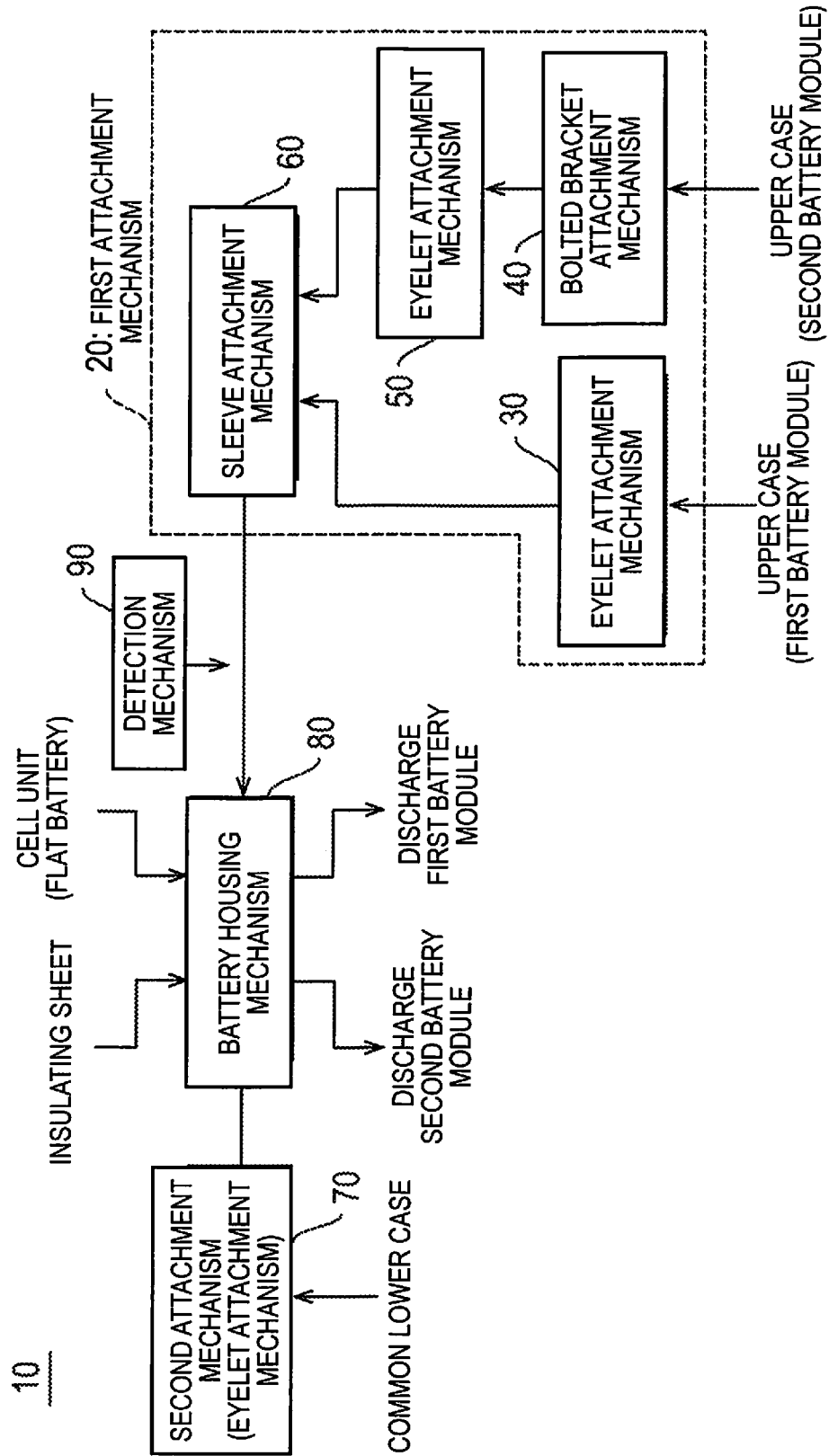
FIG. 6 is a block diagram for explaining the battery manufacturing apparatus according to the embodiment of the present invention.

FIG. 6 is a block view for explaining the battery manufacturing apparatus according to an embodiment of the present invention.

The battery manufacturing apparatus 10 comprises a first attachment mechanism 20, a second attachment mechanism 70, a battery housing mechanism 80, a detection mechanism 90, and a transport mechanism (not shown), as illustrated in FIG. 6.

The first attachment mechanism 20 is used for assembling the upper case 122, to which are attached components having different specifications, and comprises eyelet attachment mechanisms 30 and 50, a bolted brackets attachment mechanism 40, and a sleeve attachment mechanism 60.

The eyelet attachment mechanism 30 is used for attaching the eyelets 164 to the through-holes 124 of the upper case 122 for the first battery module 100A. The bolted brackets attachment mechanism 40 is used for attaching the bolted brackets 126, which are components having specification differences, to the upper case 122 for the second battery module 100B. The eyelet attachment mechanism 50 is used for attaching the eyelets 164 to the through-holes 124 of the upper case 122 for the second battery module 100B, via the through-holes 128 of the bolted brackets 126.

The sleeve attachment mechanism 60 is used for attaching the sleeves 174, which are components having different specifications, to the upper case 122 for the first battery module 100A and to the upper case 122 for the second battery module 100B. The short sleeves 174 are applied to the upper case 122 for the second battery module 100B in order to absorb the difference based by the presence/absence of bolted brackets 126 (to make the thickness of the first battery module 100A the same as the thickness of the second battery module 100B).

The second attachment mechanism 70 is used for assembling the lower case 112, to which are attached components having no specification differences. A component having no specification difference is the eyelets 154, and the second attachment mechanism 70 is composed of the eyelet attachment mechanism. That is, the lower case 112 for the first battery module 100A and the lower case 112 for the second battery module 100B are in common (the same).

The battery housing mechanism 80 is used for disposing the cell unit (flat battery) 130 between the upper case 122 and the lower case 112. Specifically, a battery module is produced by the insulating sheet 140, the cell unit 130, and the insulating sheet 142 and the upper case 122, being sequentially placed on the lower case 112 (refer to FIG. 1 and FIG. 2). A battery module comprising the upper case 122, to which the bolted brackets 126 and the short sleeves 174 are attached, is thereby disposed as a second battery module 100B, and a battery module comprising the upper case 122, to which the long sleeves 174 is attached, is disposed as the first battery module 100A.

The detection mechanism 90 comprises, for example, a sensor having a camera, and is used for detecting the attachment state of the bolted brackets 126 and the short sleeves 174 with respect to the upper case 122. The detection of the attachment state is utilized for detecting attachment faults, or the like. An attachment fault is, for example, an attachment of bolted brackets 126 and/or an attachment of the short sleeves 174 to the upper case 122 of the first battery module 100A, or an attachment of the long sleeves 174 and/or the non-attachment of bolted brackets 126 to the upper case 122 of the second battery module 100B.

The detection mechanism 90 is disposed on the upstream side of the battery housing mechanism 80 and on the downstream side of the first attachment mechanism 20, that is, between the battery housing mechanism 80 and the sleeve attachment mechanism 60. Therefore, the battery housing mechanism 80 is capable of detecting the attachment state of a plurality of components having different specifications (bolted brackets 126 and short sleeves 174) before disposing the cell unit (flat battery) 130 between the upper case 122 and the lower case 112. The detection mechanism 90 is not limited to a mode that utilizes a sensor having a camera.

The transport mechanism is configured from, for example, a first, second, and third conveyor. The first conveyor is used for transporting the upper case 122 for the first battery module 100A to the sleeve attachment mechanism 60 via the eyelet attachment mechanism 30, or for transporting the upper case 122 for the second battery module 100B to the sleeve attachment mechanism 60 via the bolted brackets attachment mechanism 40 and the eyelet attachment mechanism 50. The second conveyor is used for transporting a common lower case 112 relating to the first battery module 100A and the second battery module 100B to the battery housing mechanism 80 via the second attachment mechanism (eyelet attachment mechanism) 70. The third conveyor is used for transporting the upper case 122 for the first battery module 100A and the upper case 122 for the second battery module 100B to which a plurality of components having different specifications are appropriately attached from the sleeve attachment mechanism 60 to the battery housing mechanism 80.

In the battery manufacturing apparatus 10, as described above, the plurality of components having different specifications (the bolted brackets 126 and the short sleeves 174) are collectively attached to the upper case 122, and thus it is not necessary to dispose equipment (detection mechanism) to detect specification differences with respect to the lower case 112; therefore, capital investment costs are reduced. Therefore, it is possible to reduce the equipment costs of the battery manufacturing apparatus 10.

Next, the eyelet attachment mechanisms 30, 50 and 70 and the sleeve attachment mechanism 60 will be described.

Figure 7:
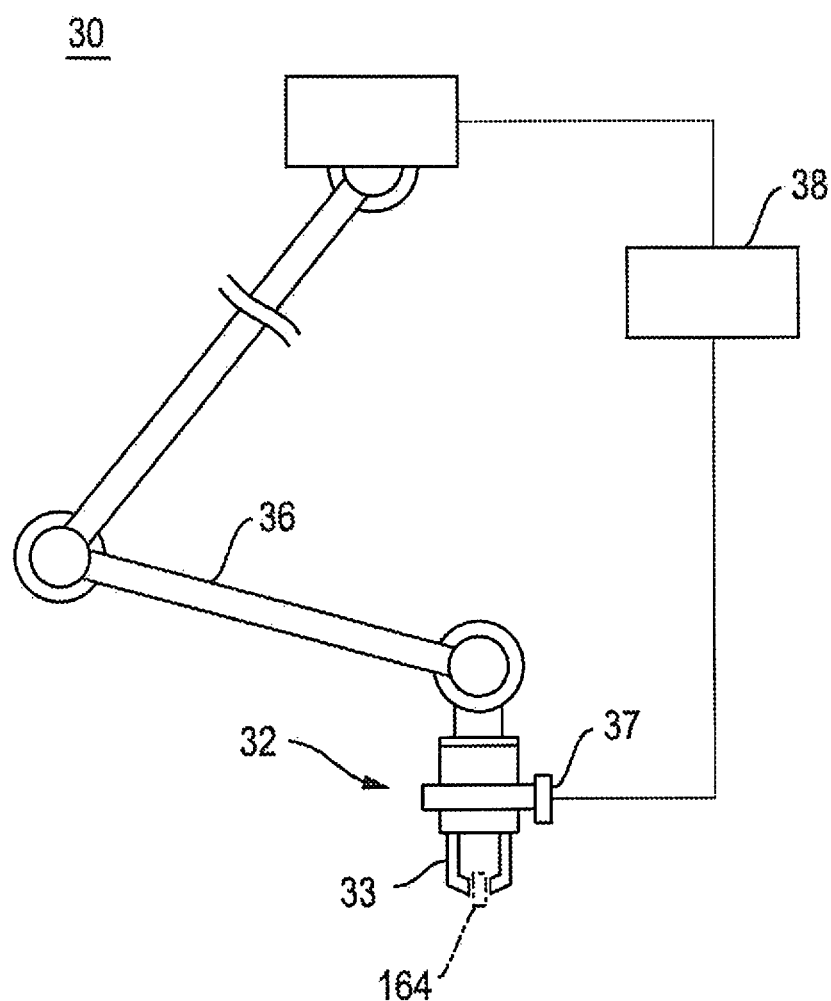
FIG. 7 is a schematic view for explaining one example of the eyelet attachment mechanism and the sleeve attachment mechanism illustrated in FIG. 6.

FIG. 7 is a schematic view for explaining one example of the eyelet attachment mechanism and the sleeve attachment mechanism illustrated in FIG. 6.

The eyelet attachment mechanism 30 is, for example, a picking robot (automatic assembly machine) comprising a workpiece holding unit 32, an arm unit 36, an imaging device 37 and a control unit 38.

The workpiece holding unit 32 comprises a multi-fingered hand 33 that has a plurality of fingers and that are capable of freely approaching and separating from each other, in order to hold the eyelets 164. The arm unit 36 comprises, for example, a three-axis robot arm, and the workpiece holding unit 32 is disposed at the distal end of the arm.

The imaging device 37 comprises, for example, a camera, and is disposed in the workpiece holding unit 32 to be used for capturing the eyelets 164. The captured data are utilized for ascertaining the orientation and the shape of the eyelet s164, and to hold the eyelets 164 with the multi-fingered hand 33.

The control unit 38 comprises a control circuit configured from a microprocessor, and the like, which executes control of each part of the eyelet attachment mechanism 30 and various calculation processes according to a program. For example, the control unit 38 is capable of controlling the workpiece holding unit 32 to cause the multi-fingered hand 33 to hold the eyelets 164 based on the imaging data of the imaging device 37, then controlling the arm unit 36 to transport the eyelets 164 held by the multi-fingered hand 33 to position the eyelet above the through-holes 124 of the upper case 122 for the first battery module 100A, and inserting the eyelets into the through-holes 124 to carry out an attachment.

The retention of the eyelet 164 is not limited to a mode that utilizes a multi-fingered hand 33; it is also possible appropriately to apply a retention means that utilizes a suction cup or a retention that utilizes magnetic force if necessary. It is also possible to combine a retention means that utilizes a suction cup or a retention means that utilizes magnetic force with a multi-fingered hand.

Aside from the fact that the object to be held by the multi-fingered hand 33 of the workpiece holding unit 32 is different, the configuration of the eyelet attachment mechanisms 50, 70 and the sleeve attachment mechanism 60 is generally the same as the eyelet attachment mechanism 30; therefore, the description thereof is omitted.

Next, the bolted brackets attachment mechanism 40 and the battery housing mechanism 80 will be described.

Figure 8:
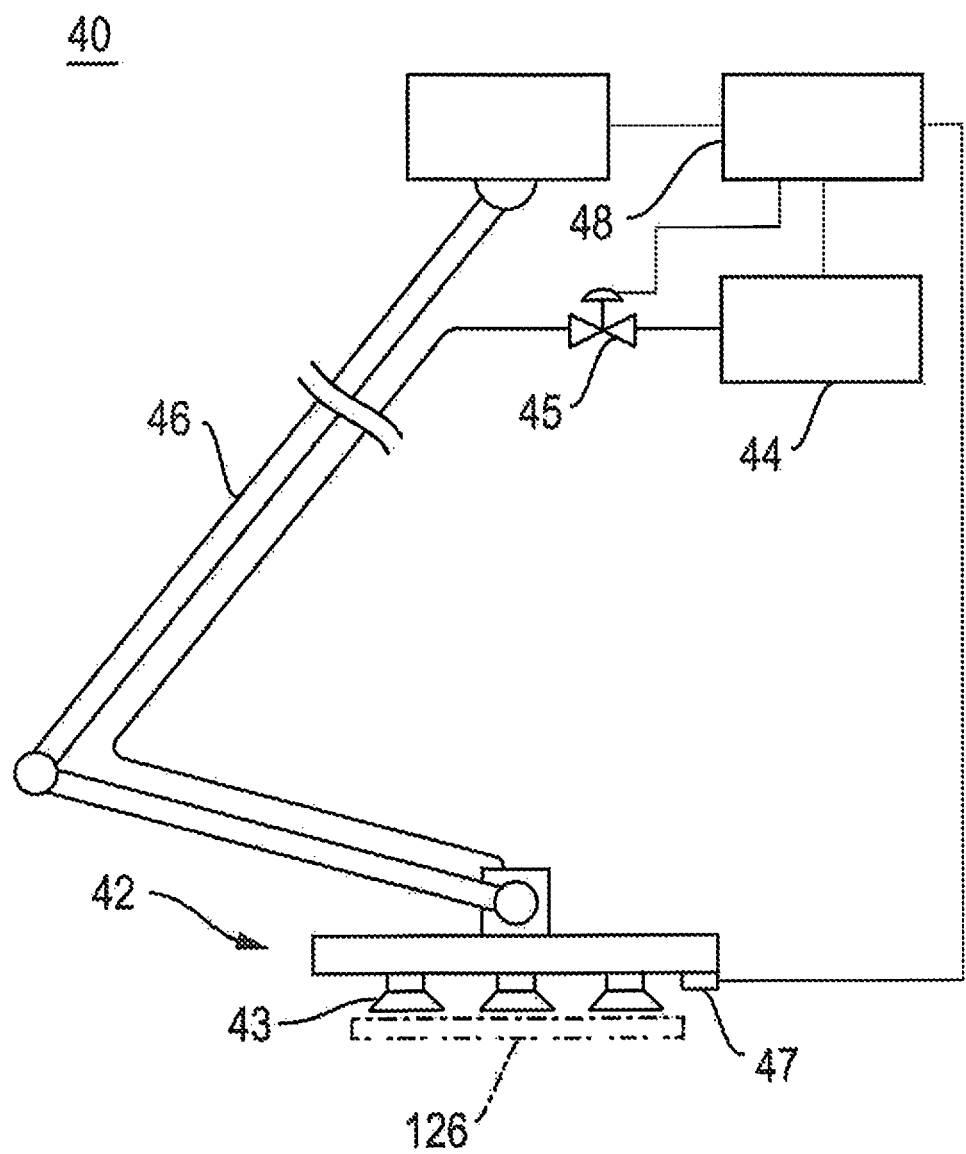
FIG. 8 is a schematic view for explaining one example of the battery housing mechanism and the bolted brackets attachment mechanism illustrated in FIG. 6.

FIG. 8 is a schematic view for explaining one example of the battery housing mechanism and the bolted brackets attachment mechanism illustrated in FIG. 6.

The bolted brackets attachment mechanism 40 is, for example, a picking robot (automatic assembly machine) comprising a workpiece holding unit 42, a vacuum pump 44, a control valve 45, an arm unit 46, an imaging device 47, and a control unit 48.

The workpiece holding unit 42 comprises a plurality of suction cups 43 that hold the bolted brackets 126. The vacuum pump 44 is connected to the suction cups 43 via a piping system, and is used for exerting a retention (suction) force by means of the suction cups 43 by applying negative pressure between the bolted brackets 126 and the suction cups 43. The control valve 45 is disposed in the piping system, and is configured to be capable of releasing the negative pressure between the bolted brackets 126 and the suction cups 43. The arm unit 46 comprises, for example, a three-axis robot arm, and the workpiece holding unit 42 is disposed at the distal end of the arm.

The imaging device 47 comprises, for example, a camera, and is disposed in the workpiece holding unit 42 to be used for capturing the bolted brackets 126. The captured data are utilized for ascertaining the orientation and the shape of the bolted brackets 126, and to hold the bolted brackets 126 with the suction cups 43.

The control unit 48 comprises a control circuit configured from a microprocessor, and the like, which executes control of each part of the bolted brackets attachment mechanism 40 and various calculation processes according to a program. For example, the control unit 48 is capable of controlling the workpiece holding unit 42 to cause the suction cups 43 to hold the bolted brackets 126 based on the imaging data of the imaging device 47, then controlling the arm unit 46 to transport the bolted brackets 126 held by the suction cups 43 to attach the bolted brackets to the upper case 122 for the second battery module 100B. At this time, the through-hole 128 of the bolted brackets 126 is aligned with the through-holes 124 of the upper case 122 for the second battery module 100B. The through-holes 124 are positioned in the vicinity of the side on which the external output terminals 132 and 133 and the voltage detection terminal 136 of the cell unit 130 are arranged.

The retention of the bolted brackets 126 is not limited to a mode that utilizes the suction cups 43; it is also possible appropriately to apply a retention that utilizes multi-fingered hand or a retention means that utilizes magnetic force if necessary. It is also possible to combine a retention means that utilizes a multi-fingered hand with the suction cups 43.

Aside from the fact that the object to be held by the suction cups 43 of the workpiece holding unit 42 is different, the configuration of the battery housing mechanism 80 is generally the same as the bolted brackets attachment mechanism 40; therefore, the description thereof is omitted.

As described above, according to the present embodiment, the plurality of components having different specifications are collectively attached to the upper case, and thus it is not necessary to dispose equipment to detect specification differences (detection mechanism) with respect to the lower case; therefore, capital investment costs are reduced. Therefore, it is possible to provide a battery manufacturing apparatus for manufacturing battery modules capable of reducing equipment costs.

If the plurality of components having different specifications are bolted brackets and a sleeve, when configuring a battery pack by stacking a first battery module and a second battery module, it is possible to utilize the bolt of the bolted brackets to fix the second battery module to a fastening member that couples the pair of end plates of the battery pack.

When disposing a detection mechanism that detects the attachment state of the plurality of components having different specifications on the upstream side of the battery housing mechanism and the downstream side of the first attachment mechanism, it is possible to detect the attachment state of the plurality of components having different specifications before disposing a cell unit (flat battery) between an upper case and a lower case.

The present invention is not limited to the embodiment described above, and various modifications are possible within the scope of the claims. For example, the flat battery included in the cell unit of the battery module is not limited to a flat lithium ion secondary battery. In addition, the plurality of components having different specifications can be configured to be collectively attached to the lower case if necessary.

The invention claimed is:

1. A battery manufacturing apparatus that produces a plurality of types of battery modules having a flat battery housed inside a case having an upper case and a lower case, and having different specifications between a plurality of components that are attached to the case, the battery manufacturing apparatus comprising:

a first attachment mechanism configured to be attached to one of the upper case and the lower case of the plurality of components having different specifications;

a second attachment mechanism configured to be attached to one of the upper case and the lower case of the plurality of components having no specification differences; and a battery housing mechanism having a flat battery arranged between the upper case and the lower case.

2. The battery manufacturing apparatus according to claim 1, wherein the plurality of components are bolted brackets and sleeves.

3. The battery manufacturing apparatus according to claim 1, further comprising a detection mechanism configured to detect an attachment state of the plurality of components having different specifications, the detection mechanism being disposed on an upstream side of the battery housing mechanism and on a downstream side of the first attachment mechanism.

4. The battery manufacturing apparatus according to claim 2, further comprising a detection mechanism configured to detect an attachment state of the plurality of components having different specifications, the detection mechanism being disposed on an upstream side of the battery housing mechanism and on a downstream side of the first attachment mechanism.

* * * * *